(12) United States Patent
Coster

(10) Patent No.: US 12,409,416 B2
(45) Date of Patent: Sep. 9, 2025

(54) FILTER MONITORING SYSTEM

(71) Applicant: MEMBRANE SENSOR SYSTEMS LIMITED, Edinburgh (GB)

(72) Inventor: Leonard Coster, Reykjavík (IS)

(73) Assignee: MEMBRANE SENSOR SYSTEMS LIMITED, Edinburgh (GB)

( * ) Notice: Subject to any disclaimer, the term of this patent is extended or adjusted under 35 U.S.C. 154(b) by 0 days.

(21) Appl. No.: 18/619,937

(22) Filed: Mar. 28, 2024

(65) Prior Publication Data

US 2024/0325978 A1    Oct. 3, 2024

(30) Foreign Application Priority Data

Mar. 28, 2023 (GB) .................................. 2304529.7

(51) Int. Cl.
    *B01D 61/12*    (2006.01)

(52) U.S. Cl.
    CPC .......... *B01D 61/12* (2013.01); *B01D 2311/16* (2013.01); *B01D 2313/60* (2022.08)

(58) Field of Classification Search
    CPC ............... B01D 2313/60; B01D 63/12; B01D 2319/022; B01D 63/106; B01D 2313/21; B01D 2319/02; B01D 63/10; B01D 2313/10; B01D 2313/12; B01D 2313/70; B01D 2313/702; B01D 2313/903; G01F 3/00
    See application file for complete search history.

(56) References Cited

U.S. PATENT DOCUMENTS

| | | |
|---|---|---|
| 10,894,725 B1 | 1/2021 | Arnold et al. |
| 2013/0334124 A1* | 12/2013 | Konishi ................. B01D 63/12 |
| | | 210/321.83 |
| 2014/0027370 A1 | 1/2014 | Kobayashi et al. |
| 2014/0180610 A1 | 6/2014 | Chatterjee et al. |
| 2020/0197869 A1 | 6/2020 | Coster |
| 2020/0197870 A1* | 6/2020 | Jons ......................... C02F 1/44 |
| 2021/0275972 A1* | 9/2021 | Jons ..................... B01D 63/101 |

FOREIGN PATENT DOCUMENTS

| | | |
|---|---|---|
| EP | 2233198 A1 | 9/2010 |
| WO | 2018/044407 A1 | 3/2018 |
| WO | 2018/187024 A1 | 10/2018 |

(Continued)

OTHER PUBLICATIONS

UK Search Report for Application No. GB2304529.7 dated Sep. 29, 2023.

(Continued)

*Primary Examiner* — Pranav N Patel
(74) *Attorney, Agent, or Firm* — POLSINELLI PC

(57) ABSTRACT

A fluid filtration system and methods of using the same is provided. The fluid filtration system includes a fluid processing pressure vessel. The fluid processing pressure vessel includes a plurality of fluid filtration modules provided in series between an inlet and a permeate outlet, at least one sensor module, and at least one data collection module. The at least one sensor module includes a body, at least one sensor, and a data transmitter. The at least one data collection module includes a data receiver configured to receive data from the data transmitter of the at least one sensor module.

14 Claims, 6 Drawing Sheets

(56) References Cited

FOREIGN PATENT DOCUMENTS

| WO | 2019/022864 A1 | 1/2019 |
| WO | 2020/159792 A1 | 8/2020 |
| WO | 2022/026156 A1 | 2/2022 |

OTHER PUBLICATIONS

International Search Report of PCT/GB2024/050823 dated Jun. 18, 2024.
Dayton Water Systems: "Basics of Reverse Osmosis", May 27, 2022 (May 27, 2022), pp. 1-14, XP093175929, Retrieved from the Internet: URL:https://web.archive.org/web/2022052703 2207if /https://daytonwatersystems.com/wp-content/uploads/basics-of-reverse-osmosis-dws.pdf [retrieved on Jun. 18, 2024].
Anonymous: "Dow Water & Process Solutions FILMTEC(TM) Reverse Osmosis Membranes", dow, Jan. 1, 2019 (Jan. 1, 2019), pp. 1-181, XP055879845, Retrieved from the Internet: URL:https://dokumen.tips/download/link/dow -filmtec-manual [retrieved on Jan. 17, 2022].

\* cited by examiner

FILTER MONITORING SYSTEM

CROSS-REFERENCE TO RELATED APPLICATION

The present application claims priority benefit to GB Application No. 2304529.7, filed Mar. 28, 2023, the entire contents of which is hereby incorporated by reference.

FIELD

The present disclosure relates to fluid filtration monitoring systems and fluid filtration systems comprising a fluid filtration monitoring system.

BACKGROUND

Fluid filtration systems are used to process fluids to separate out a component of the fluid being processed from impurities or similar.

For example, water filtration systems process aqueous fluids such as sea water or waste water to produce pure or substantially pure water. Water filtration systems often comprise multiple water filtration modules provided in series retained within a container or pressure vessel between an inlet and two separate outlets, a permeate outlet from which the permeate fluid that has passed through filtration material flows and a reject outlet from which reject fluid that has not passed through filtration material flows. Aqueous fluid to be processed is urged into the inlet of the container at high pressure and then into a first water filtration module within a series of water filtration modules; this is the feed fluid. A portion of the water within the aqueous fluid will pass through a filtration membrane into a permeate tube connected to the permeate outlet to thereby separate out pure or substantially pure water (the permeate) from the aqueous fluid being processed, whilst other materials dissolved or suspended in the aqueous fluid will not generally/significantly pass through the filtration membrane. The remaining aqueous fluid (the reject) passes to the next water filtration module in the series as the feed for that water filtration module where a further portion of the fluid passes through the filtration membrane as additional permeate, and so on and finally what remains of the fluid passes out of the reject outlet of the pressure vessel.

Fluid filtration modules used in series can be prone to fouling depending on the fluid being processed. For example, in sea water processing in desalination plants the fluid filtration modules may suffer from biofouling where biological material or organisms contained within the sea water build up on the feed spacer/fabric and/or filtration material, such as a filtration membrane, of the fluid filtration modules to thereby obstruct the flow of feed water through the module and reduce the hydraulic permeability of the filtration material. In addition, other material such as organic materials and minerals in the sea water may be deposited onto the filtration material to reduce the hydraulic permeability of the filtration membrane as well as interfering with the selectivity of the membrane to block (reject) the dissolved materials such as salts from passing through the filtration membrane.

As a result, fluid filtration modules need to be cleaned regularly to maintain performance.

Fluid filtration systems operators typically monitor parameters such as pressure and flow rate and salinity (to obtain osmotic pressure and salt passage into the permeate) at the feed inlet and reject and permeate outlets of the pressure vessel container.

However, it is often not possible to know the specific reason why the drop in performance across the series of fluid filtration modules has occurred. For example, is the reduction in performance due to bio-fouling, mineral scaling or filtration material failure? The operator has to guess the reason for the loss in performance and apply a treatment or course of action accordingly. If the first course of action is unsuccessful, the operator must try a further maintenance action, and potentially consider using aggressive chemical cleaning methods and/or replacement of one or more fluid filtration modules within the fluid filtration system.

This typical trial and error approach can lead to extended down time for a fluid filtration system and increases in the costs associated with maintaining a fluid filtration system.

Additionally, by the time fouling is detected by a drop in overall system performance, the fouling may already have exceeded the limits of normal cleaning for one or more fluid filtration modules within the system such that cleaning is required or is no longer effective. Rather, one or more of the fluid filtration modules may need to replaced.

Therefore, there remains a need for improved monitoring systems and methods of monitoring fluid filtration systems.

At least some aspects of the present disclosure provide improved apparatus, systems for use in monitoring fluid filtration systems, and methods of using the same.

SUMMARY

According to a first aspect there is provided a sensor module configured to be installed between adjacent fluid filtration modules in a fluid processing pressure vessel, the sensor module comprising a body, at least one sensor and a data transmitter.

Whilst the sensor module of the present aspect is useful in any number of fluid filtration systems and fluid filtration modules, an example fluid filtration system and fluid filtration modules are described below to illustrate the features and benefits provided by the sensor module of the present aspect. The example fluid filtration system described in the present aspect should not be construed in any way as being limiting.

A fluid filtration module with which the sensor module may be used may comprise a permeate tube around which a filter membrane is wrapped. During use fluid from the feed fluid (i.e. fluid fed into the fluid filtration module to be processed) may be urged through the fluid filtration module such that a portion of the fluid passes through the filter membrane (the permeate) and is collected in the permeate tube. The remainder of the fluid passes through and exits the other end of the fluid filtration module (the reject). Accordingly, a fluid filtration module may comprise a feed-side (i.e. the side or portion of the fluid filtration module within which feed fluid or reject fluid that has not passed through the filter membrane is flowing) and a permeate side (i.e. within the filter membrane or within the permeate tube where fluid that has passed through the filter membrane flows). The fluid filtration modules may further comprise a cap (also known as an anti-telescoping device, ATD) that prevents the filter membrane telescoping out of the fluid filtration module as it is subjected to high pressures and/or fluid flow rates from the feed side. Typically, the cap acts as a physical barrier that prevents the filter membrane of the fluid filtration module from being pushed out of the fluid filtration module by the flow of fluid being urged through the fluid filtration module during use.

For the avoidance of doubt, the fluid entering a given fluid filtration module is the feed for that fluid filtration module and the fluid exiting a given fluid filtration module is the reject of that fluid filtration module and becomes the feed for the next fluid filtration module in the series. A feed fluid that flows through a suitable fluid filtration module is separated into a permeate and a reject. Therefore, the use of terms "feed" and "reject" are both to be understood as referring to the fluid that has not passed through a fluid filtration material or filter membrane.

When fluid filtration modules are arranged in series, the permeate tubes of the fluid filtration modules are typically connected together and to the permeate outlet to form a continuous fluid pathway. The permeate tubes are often connected together using connector tubes fitted with appropriate seals at either ends of the connector tube.

The sensor module may be configured to be positioned between adjacent fluid filtration modules on a feed-side of the adjacent fluid filtration modules. The sensor module may be configured to be positioned between the inlet of the fluid processing pressure vessel and a first fluid filtration module in a series of fluid filtration modules retained within the fluid processing pressure vessel. The sensor module may be configured to be positioned between an outlet of the fluid processing pressure vessel and a final fluid filtration module in a series of fluid filtration modules retained within the fluid processing pressure vessel. The body of the sensor module may be configured to be attached to the cap. The sensor module may be positioned on the cap to measure at least one parameter of the fluid flowing on the feed-side of the fluid filtration module. The sensor module may be positioned on or adjacent to the cap to measure at least one parameter of the reject fluid flowing from a first fluid filtration module to an adjacent second fluid filtration module.

The body may be a tubular body. The tubular body may be configured to be inserted or installed into a permeate tube of a fluid filtration module. The tubular body may be configured to be inserted or installed into a permeate tube of two adjacent fluid filtration modules. The tubular body may be configured to be inserted or installed into the inlet. The tubular body may be configured to be inserted or installed into the reject outlet. The tubular body may be configured to be inserted or installed into the permeate outlet. The tubular body may comprise a first end and a second end. The first end of the tubular body may be inserted or installed into the permeate tube of a first fluid filtration module and the second end of the tubular body may be inserted or installed into the permeate tube of a second adjacent fluid filtration module. The tubular body may form a continuous fluid pathway from the permeate tube of a first fluid filtration module to the permeate tube of a second adjacent fluid filtration module. The sensor module may be configured to replace a connector tube.

As used herein the term "tubular body" refers to a body that comprises a channel that extends from a first end of the body to a second end of the body. The first end may be opposed to the second end. Fluid may flow through the channel of the tubular body. Fluid may flow past the exterior of the body of the tubular body. The channel may have a regular cross-section. The channel may have a circular or elliptical cross-section. The channel may have a triangular, rectangular, pentagonal, hexagonal or higher polygonal cross-section. The channel may have an irregular cross-section. The tubular body may be a tube. The tubular body may be generally cylindrical.

The tubular body of the sensor module may be dimensioned to be similar to a standard connector tube or to match the outer diameter of a standard connector tube. The sensor module may be configured to be retro-fitted into an existing fluid filtration system without significant modification of the fluid filtration modules of the fluid processing pressure vessel by replacing the normal connecting tube.

The tubular body may comprise one or more sealing elements. A first sealing element may be positioned at a first end of the tubular body. A second sealing element may be positioned at a second end of the tubular body. The first end of the tubular body may be configured to be installed within the permeate pipe of a first fluid filtration module and the first sealing element may form a seal between the interior surface of the permeate pipe of the first fluid filtration module and the exterior surface of the first end of the tubular body. The second end of the tubular body may be configured to be installed within the permeate pipe of a second fluid filtration module and the second sealing element may form a seal between the interior surface of the permeate pipe of the second fluid filtration module and the exterior surface of the second end of the tubular body. The first and second sealing elements may be deformable portions of the tubular body, that are configured to deform when compressed against the inner surface of a permeate pipe to thereby form a seal between the permeate pipe and the tubular body. The first and second sealing elements may be one or more o-rings or similar that are installed into the tubular body prior to installation.

The body may comprise at least one sensor. In embodiments where the body is a tubular body, the at least one sensor may be configured to detect at least one parameter of the fluid flowing through the channel of the tubular body. For example, the at least one sensor may extend into the channel of the tubular body or may be otherwise exposed to fluid that flows through the channel of the tubular body during use.

The at least one sensor may be configured to detect at least one parameter of the fluid flowing past the exterior of the body. For example, the at least one sensor may be positioned on the exterior of the body or may be otherwise exposed to fluid that flows past the exterior of the body.

The body may comprise a plurality of sensors. In embodiments where the body is a tubular body, at least one sensor of the plurality of sensors may be provided within the channel of the tubular body. At least one sensor of the plurality of sensors may be provided on the exterior of the body.

The sensor module may comprise at least one elongate element extending away from the body. The at least one elongate element may extend radially away from the body. The at least one elongate element may extend tangentially away from the body or otherwise.

The at least one elongate element may comprise at least one sensor. The at least one elongate element may have a proximal end adjacent to or connected to the body and a distal end furthest from the body. The at least one sensor of the at least one elongate element may be positioned at the distal end. The at least one sensor of the at least one elongate element may be positioned at the proximal end. The at least one sensor of the at least one elongate element may be positioned part way between the proximal end and distal end. In embodiments where the sensor module comprises a plurality of sensors, the plurality of sensors may be provided at the proximal end, the distal end or part way between the proximal and distal ends. The plurality of sensors may be distributed along the length or width of the elongate element.

The sensor module may comprise a support. In embodiments where the sensor module comprises an at least one elongate element, the support may comprise one or more of the at least one elongate element. The support may extend away from the body. The support may be substantially planar. The support therefore may extend away from the body within a plane or substantially within a plane. The plane of the support may be perpendicular to the line between the first end and the second end of the body. During use, the plane of the support may be perpendicular to the direction of flow of fluid past the support. The at least one elongate element may extend away from the tubular body within the plane of the support. The support may comprise a plurality of elongate elements that extend away from the body. At least one elongate element of the plurality of elongate elements may comprise at least one sensor. The support may allow components of the sensor module to be positioned at a fixed position between two adjacent fluid filtration modules. For example, the support may allow one or more sensors of the at least one sensor to be positioned at a fixed position relative to the body. The support may allow one or more electronic components of the sensor module to be positioned at a fixed position relative to the body. The support may be configured to minimally impede the flow of fluid through or past it.

The data transmitter may be provided on the support. The data transmitter may be provided at an extremity of the support. The data transmitter may be provided on one of the at least one elongate elements. The data transmitter may be provided at an extremity of the elongate element. The data transmitter may be provided at the distal end of the elongate element.

Preferably, the data transmitter may be configured during use to transmit data wirelessly to a data receiver exterior to a fluid processing pressure vessel.

Alternatively, the data transmitter may be configured during use to transmit data via a wired connection to a data receiver exterior to a fluid processing pressure vessel. During use, the wired connection may run from the data transmitter through the fluid filtration modules to an outlet of the fluid processing pressure vessel. The wired connection may run from the data transmitter through the permeate tube of the fluid filtration modules to the low pressure side. The wired connection may run from the data transmitter through the permeate tube of the fluid filtration modules to the high pressure side. The wired connection may run from the data transmitter through a wall of the fluid processing pressure vessel. The fluid processing pressure vessel may comprise a pressure resistant opening associated with the sensor module to allow the wired connection to run through the wall of the fluid processing pressure vessel without compromising the integrity of the fluid processing pressure vessel.

The sensor module may further comprise an energy receiver configured to receive energy wirelessly from an external energy transmitter to thereby power the sensor module. In embodiments where the sensor module comprises an elongate element, the energy receiver may be provided at the distal end of the elongate element. Alternatively, the energy receiver may be provided at the proximal end or part way between the distal end and proximal end of the elongate element. The energy receiver may comprise a near field induction coil. The data transmitter may comprise the energy receiver. The data transmitter may be the energy receiver. In embodiments where the sensor module comprises a support and/or an at least one elongate element, the energy receiver may be provided at a position on the support or at least one elongate element that is furthest from the tubular body.

The sensor module may be configured to receive energy via a wired connection. In embodiments where the sensor module transmits data via a wired connection, the sensor module may be configured to receive energy via that wired connection.

The sensor module may comprise an energy source. The energy source may be a battery. The battery may be the primary energy source for the sensor module. The battery may be a secondary energy source to be used when the primary energy source is spent or malfunctions.

The sensor module may be configured to extract energy from the fluid being processed through the fluid filtration modules. The sensor module may form an electrolytic cell with the fluid being processed through the fluid filtration modules. The sensor module may comprise electrodes and the fluid being processed may be an electrolyte for the electrolytic cell.

The at least one sensor may be configured to determine at least one parameter selected from the group: flow rate, pressure, salinity/conductivity, viscosity, turbidity and temperature.

In embodiments where the body is a tubular body, the at least one sensor may be configured to determine at least one parameter of fluid flowing through the tubular body (i.e. the permeate). The at least one sensor may be configured to determine at least one parameter of fluid flowing past the exterior of the body (i.e. the reject/feed). In embodiments comprising an at least one elongate element, the at least one sensor may be configured to determine at least one parameter of fluid flowing past the at least one elongate element (i.e. the reject/feed).

The at least one sensor may comprise a first pressure sensor. In embodiments where the body is a tubular body, the first pressure sensor may be positioned to measure pressure of fluid flowing through the tubular body. The first pressure sensor may be positioned to measure pressure of fluid flowing past the exterior of the body. Accordingly, the first pressure sensor may be positioned to measure or determine the pressure of the permeate or the reject/feed.

The at least one sensor may comprise a second pressure sensor. The second pressure sensor may be positioned such that it is configured during use to measure or determine the pressure of the permeate or the reject/feed.

The at least one sensor may comprise a first pressure sensor and a second pressure sensor. The first pressure sensor may be positioned such that it is configured during use to measure or determine the pressure of the reject/feed and the second pressure sensor may be positioned such that it is configured during use to measure or determine the pressure of the permeate. Accordingly, the sensor module may be configured to measure both the pressure of the reject/feed and the pressure of the permeate flowing from a fluid filtration module during use.

The at least one sensor may comprise a conductivity sensor or an array of conductivity sensors. The conductivity sensor is typically an electrical conductivity sensor. The conductivity sensor or array of conductivity sensors may be configured during use to measure or determine the conductivity of fluid flowing past the body. The conductivity sensor or array of conductivity sensors may be configured to measure or determine the conductivity of the reject/feed. In embodiments where the body is a tubular body, the conductivity sensor or array of conductivity sensors may be configured during use to measure or determine the conductivity of fluid flowing through the channel of the tubular body. The conductivity sensor or array of conductivity sensors may be configured to measure or determine the conductivity of the permeate. The conductivity sensor or array of conductivity sensors may be positioned within the channel of the tubular body. The conductivity sensor or array of conductivity sensors may be positioned on the exterior of the body. In embodiments comprising an at least one elongate element the conductivity sensor or array of conductivity sensors may be positioned on the elongate element.

The fluid may be a liquid. The liquid may be an aqueous liquid. The aqueous liquid may be a salt water liquid. For example, the aqueous liquid may be sea water, ground water, waste water, fracking water or similar. Accordingly, the fluid filtration module may be a water filtration module and may be configured to separate water from the aqueous liquid to produce a pure or substantially pure water from the aqueous liquid.

The liquid may be a non-aqueous liquid. The non-aqueous liquid may be an oil. The non-aqueous liquid may comprise liquid hydrocarbons. The oil may be crude oil. The oil may be a crude oil fraction. The liquid may be a mixture. The liquid may be a mixture of aqueous and non-aqueous liquids. For example, the liquid may comprise an oil and salt water.

The fluid may be a gas. The fluid may be a plasma.

In a second aspect there is provided a data collection module configured to receive data from a sensor module according to the first aspect, wherein the data collection module comprises a data receiver configured to receive data transmitted by the data transmitter of the sensor module.

The fluid filtration pressure vessel may comprise a pressure vessel casing. The data collection module may be configured to be mounted onto the pressure vessel casing. The data collection module may be accessible to an operator during use. In embodiments where the data collection module receives data from a sensor module via a remote connection (i.e. a non-wired connection), the data collection module may allow an operator to receive the data from the sensor module during use without the integrity of the pressure vessel casing being compromised to allow a wire to pass through it. Furthermore, the data collection module may be simpler to implement in an existing fluid filtration system due to it only being required to be mounted onto the existing pressure vessel casing without requiring any modification of the pressure vessel casing itself.

The data collection module may be configured to be connected to a central data processing unit. The data collection module may transmit data received from a sensor module to the central data processing unit during use. The data collection module may perform an operation using the data or a portion of the data received from a sensor module and the output of that operation may be transmitted to the central data processing unit.

The data collection module may be configured to receive data from a plurality of sensor modules. The data collection module may transmit the data received from a plurality of sensor modules to a central data processing unit during use. The data collection module may perform an operation using the data or a portion of the data received from a plurality of sensor modules to produce one or more outputs and the one or more outputs of that operation may be transmitted to the central data processing unit.

The at least one data collection module may comprise an energy transmitter. During use the energy transmitter may transmit energy to the energy receiver of a sensor module to thereby power a sensor module.

The data collection module may further comprise a fastener such that the data collection module is configured to be mounted onto the exterior of a fluid processing pressure vessel. The fastener may be an adhesive that may adhere the data collection module to the exterior of a fluid processing pressure vessel. The fastener may be a mechanical fastener that may mechanically mount the data collection module to the exterior of a fluid processing pressure vessel. The fastener may include a strap or tie. In embodiments where the data collection module is configured to receive data from a sensor module remotely (e.g. via a non-wired connection) the strap or tie may include lengths of wire such that turns of wire are wrapped around the fluid processing pressure vessel to enhance the strength and/or clarity of the data signal connection to the sensor module.

The data collection module may comprise a connector that is configured to allow a cable or multi-core cable to be passed around the exterior of a fluid processing pressure vessel. The cable or multi-core cable may be wrapped around the exterior of the fluid processing pressure vessel one or more times to thereby attach the data collection module to the fluid processing pressure vessel. The cable or multi-core cable may be wrapped around the exterior of the fluid processing pressure vessel multiple times.

According to a third aspect there is provided a detection system comprising at least one sensor module according to the first aspect and at least one data collection module according to the second aspect, wherein a sensor module of the at least one sensor module is configured to be positioned between adjacent fluid filtration modules retained within a fluid processing pressure vessel, and the at least one data collection module is configured to be positioned on the exterior of the fluid processing pressure vessel.

The detection system may comprise at least one energy transmitter wherein during use the energy transmitter may transmit energy to the energy receiver of the at least one sensor module to thereby power the at least one sensor module. The detection system may comprise at least one sensor module, at least one data collection module and at least one energy transmitter.

he at least one data collection module may comprise an energy transmitter. During use the energy transmitter may transmit energy to the energy receiver of the at least one sensor module to thereby power the at least one sensor module.

A sensor module of the at least one sensor module may communicate with a data collection module of the a least one data collection module via near-field communication. The data collection module may comprise an initiator device that during use provides a carrier electromagnetic field. The sensor module may comprise a target device that may act as a transponder. The target device may communicate with the initiator device of the data collection module by modulating the carrier electromagnetic field and may draw its operating power from the carrier electromagnetic field.

The communication between the at least one sensor module and the at least one data collection module of the detection system may comply with one or more of the corresponding near-field communication interface and protocols such as ISO/IEC 18092/ECMA-340 or ISO/IEC 21481/ECMA-352, for example.

A sensor module of the at least one sensor module may communicate with a data collection module of the at least one data collection module via a Bluetooth® wireless connection, a wi-fi wireless connection or proprietary analogue or digital radio communications, or any other appropriate means, for example.

A sensor module of the at least one sensor module may communicate with a data collection module by a wired connection.

During use the at least one data collection module may be positioned on the exterior of a fluid processing pressure vessel adjacent to the at least one sensor module.

A fluid processing pressure vessel may comprise a pressure vessel casing within which a plurality of fluid processing modules are retained in series. A data collection module of the at least one data collection modules may be provided on the pressure vessel casing adjacent, or suitably positioned relative to a sensor module of the at least one sensor module. The separation between the data collection module and the sensor module may be minimized. In embodiments where the data collection module and the sensor module communicate via near field communication minimizing the separation between the data collection module and the sensor module may maximize the strength of communication between them or enhance the strength and/or clarity of the data signal connection to the sensor module.

Each sensor module within the at least one sensor module may comprise a unique identifier such that the specific sensor module from which data has been transmitted is identified. The unique identifier may correspond to the addition of an identifier to data transmitted from each sensor module within the at least one sensor module. Each sensor module within the at least one sensor module may be identified by the sequence within which data is transmitted from the at least one sensor module. In embodiments where a data collection module is associated with each sensor module within the at least one sensor module, each sensor module within the at least one sensor module may be identified by the associated data collection module to which a sensor module transmits data.

In a fourth aspect there is provided a fluid filtration system comprising a fluid processing pressure vessel comprising a plurality of fluid filtration modules provided in series between an inlet, and a reject outlet and a permeate outlet, at least one sensor module and at least one data collection module, the at least one sensor module comprises a body, at least one sensor and a data transmitter, the at least one data collection module comprises a data receiver configured to receive data from the data transmitter of a sensor module of the at least one sensor module, wherein one or more of the at least one sensor modules is positioned between two adjacent fluid filtration modules of the plurality of fluid filtration modules and a data collection module of the at least one data collection module is positioned on the exterior of the fluid processing pressure vessel, wherein during use fluid flows into the inlet of the fluid processing pressure vessel, through each fluid filtration module of the plurality of fluid filtration modules sequentially and permeate flows out of the permeate outlet and reject flows out of the reject outlet.

The at least one sensor module may be a sensor module according to the first aspect.

The at least one data collection module may be a data collection module according to the second aspect.

The combination of the at least one sensor module and the at least one data collection module may be a detection system according to the third aspect.

Each fluid filtration module within the plurality of fluid filtration modules may comprise a filtration material. The filtration material may be configured to allow a portion of the fluid flowing through the fluid filtration module to pass through the filtration material. The filtration material may be in the form of a filtration membrane. The filtration membrane may selectively allow fluid to pass through or into the filtration membrane. The filtration membrane may direct fluid that has passed through or into the membrane to a permeate tube. Accordingly, during use the fluid that flows into the fluid filtration module (the feed) may divided into fluid that does not pass through the filtration material (the reject) and fluid that passes through the filtration material (the permeate). Therefore, the fluid filtration module may correspond to a fluid filtration module as defined in the first aspect.

Typically, the fluid processing pressure vessel comprises a pressure casing and the plurality of fluid filtration modules are retained in series within the pressure casing.

The fluid processing pressure vessel may be configured to retain fluid that is urged or pumped through the fluid processing pressure vessel at high pressure. The fluid processing pressure vessel may be configured to retain fluid that is urged or pumped through the fluid processing pressure vessel at normal operating pressures. Accordingly, the fluid processing pressure vessel may be configured to withstand normal operating internal pressures for the fluid filtration system. The fluid processing pressure vessel may be configured to withstand an internal pressure of at least 2 bar. The fluid processing pressure vessel may be configured to withstand an internal pressure of at least 10 bar. The fluid processing pressure vessel may be configured to withstand an internal pressure of at least 20 bar. The fluid processing pressure vessel may be configured to withstand an internal pressure of at least 50 bar. The fluid processing pressure vessel may be configured to withstand an internal pressure of at least 60 bar. The fluid processing pressure vessel may be configured to withstand an internal pressure of at least 70 bar. The fluid processing pressure vessel may be configured to withstand an internal pressure of at least 80 bar. The fluid processing pressure vessel may be configured to withstand an internal pressure of at least 90 bar. The fluid processing pressure vessel may be configured to withstand an internal pressure of at least 100 bar. The fluid processing pressure vessel may be configured to withstand an internal pressure of from 2 bar to 300 bar. The fluid processing pressure vessel may be configured to withstand an internal pressure of from 10 bar to 300 bar. The fluid processing pressure vessel may be configured to withstand an internal pressure of from 20 bar to 300 bar. The fluid processing pressure vessel may be configured to withstand an internal pressure of from 50 bar to 300 bar.

The fluid processing pressure vessel may comprise at least two fluid filtration modules. The fluid processing pressure vessel may comprise at least three fluid filtration modules. The fluid processing pressure vessel may comprise at least four fluid filtration modules. For example, the fluid processing pressure vessel may comprise four, five, six, seven, eight, nine, ten, eleven, twelve, thirteen, fourteen or more fluid filtration modules.

The at least one sensor module may comprise a plurality of sensor modules. A sensor module of the at least one sensor module may be provided between a selected pair of fluid filtration modules or selected pairs of fluid filtration modules. A sensor module of the at least one sensor module may be provided either side of a selected fluid filtration module or selected fluid filtration modules of the plurality of fluid filtration modules. Accordingly, a sensor module may be provided on the upstream side of the selected fluid filtration module or selected fluid filtration modules and a sensor module may be provided on the downstream side of the selected fluid filtration module or selected fluid filtration modules. For the avoidance of doubt, a sensor module on the upstream side of a first fluid filtration module is also a sensor module on the downstream side of the preceding fluid filtration module in the series.

A sensor module may be provided between the first two fluid filtration modules in the plurality of fluid filtration modules. A sensor module may be provided between the last two filtration modules in the plurality of fluid filtration modules. The fluid processing pressure vessel may comprise a sensor associated with the inlet. A sensor module of the at least one sensor module may be associated with the inlet. A sensor module may be associated with the upstream side of the first fluid filtration module in the series. Accordingly, at least one parameter of the fluid flowing into the inlet or into the first fluid filtration module may be determined during use. The fluid processing pressure vessel may comprise a sensor associated with the permeate outlet. A sensor module of the at least one sensor module may be associated with the permeate outlet. A sensor module of the at least one sensor module may be provided on the downstream side of the final fluid filtration module in the series. Accordingly, at least one parameter of the fluid flowing out of the permeate outlet may be determined during use.

The fluid processing pressure vessel may comprise a sensor associated with the reject outlet. A sensor module of the at least one sensor module may be associated with the reject outlet. A sensor module of the at least one sensor module may be provided on the downstream side of the final fluid filtration module in the series. Accordingly, at least one parameter of the fluid flowing out of the reject outlet may be determined during use.

Provision of a sensor module in at least two positions between at least two fluid filtration modules in a series of fluid filtration modules allows at least one parameter to be determined at several points within the fluid processing pressure vessel. For example, when a sensor module is provided both upstream of and downstream from a fluid filtration module it is possible to determine changes in the at least one parameter across that fluid filtration module. In embodiments where upstream and downstream sensor modules are provided for more than one fluid filtration module it is possible to determine changes in the at least one parameter across those fluid filtration modules independently. In embodiments where sensor modules are provided for adjacent fluid filtration modules in a series of fluid filtration modules, the sensor module downstream from the first adjacent fluid filtration module may act as the upstream sensor module for the adjacent downstream fluid filtration module. In embodiments where the at least one parameter includes pressure and a sensor module is provided both upstream of and downstream from a fluid filtration module then it is possible to determine changes in pressure across that fluid filtration module.

Membrane filtration systems where the fluid being processed is contacted with a filtration membrane are commonly operated in one of two modes being (1) Constant Pressure Mode and (2) Constant (permeate) Flux Mode. In constant pressure mode, the applied pressure is kept constant and as contaminating material accumulates in the feed side fabric and on the membrane a decline in permeate flux occurs. Typically, an accelerating decline in production of permeate indicates the onset of fouling. In constant flux mode, the applied pressure is varied to maintain a chosen permeate flux and this pressure must be increased as contaminating material accumulates in the feed side fabric and on the membrane in order to maintain the rate of production of clean permeate. Typically, an accelerating increase in the pressure required to maintain constant flux indicates the onset of fouling.

The rate at which water is driven through the filtration membrane is determined by the hydraulic permeability of the membrane and the Net Driving Pressure. The Net Driving Pressure is the difference between the Trans-Membrane Pressure (TMP) and the osmotic pressure difference between the fluids on the feed and permeate sides of the filtration membrane. TMP is the hydraulic pressure difference between the feed side and the permeate side of the filtration membrane. The operator of a filtration system can control the TMP by adjusting the pressure on the feed and permeate sides of the membrane by controlling pumps and/or valves at the inlet, permeate outlet or reject outlet, for example.

The osmotic pressure is determined by the concentration of dissolved solids in the fluids. In filtration operations using, for example, reverse osmosis membranes, for example desalination of sea water, wastewater, ground water and similar, the osmotic pressure of the permeate is very low as the water is substantially pure. In sea water desalination the feed water contains high concentrations of dissolved solid, mainly dissolved salt.

The feed water flowing across the feed side of the filtration membranes and finally out of the reject outlet of the pressure vessel provides a so-called "crossflow" which helps to clear contaminating materials from the feed side of the filtration modules. If the crossflow is not sufficiently high, then contaminating material will accumulate in the filtration modules leading to fouling.

When fouling becomes too severe it may not be possible to adjust the feed pressure to maintain the permeate flow rate in constant flux operations and in constant pressure operations, the rate of production of permeate decreases. When this occurs, the operator carries out a cleaning process utilizing aggressive acidic or alkaline solutions, as deemed appropriate, to attempt to restore system performance. This process generally requires that the fluid filtration system be taken offline during the cleaning process. Depending on the type and extent of the fouling, the cleaning process may or may not be effective. Early detection and remedial action before the fouling becomes permanent is important.

Without being bound by theory, it is proposed that a change in the pressure drop, for example, across the feed side of the first fluid filtration module or one of the first fluid filtration modules in a series of fluid filtration modules may be indicative of biofouling. A change in trans-membrane pressure (TMP) and/or trans-membrane flux (TMF), for example, across the last fluid filtration module or one of the last fluid filtration modules in a series of fluid filtration modules may be indicative of mineral scaling.

Fluid being processed by the fluid filtration system typically comprises a fluid that is to be extracted and at least one contaminant. The at least one contaminant may be a particulate contaminant. The at least one contaminant may be a species that is dissolved within the fluid. For example, the species may be a salt that is dissolved in an aqueous liquid. The at least one contaminant may be a biological contaminant. The at least one contaminant may be an inorganic substance contaminant such as, for example, silica.

The operating conditions for each filtration module in series may be different and during operation change over time, with each membrane module removing some permeate from the feed water and thereby concentrating contaminants in the feed and reducing both the flow rate and pressure to the subsequent filtration modules in series. Where these contaminants include dissolved solids, for example salts, the osmotic pressure difference between the feed and permeate sides of the filtration membrane will increase as the volume of water in which they are dissolved decreases. This acts to decrease the net driving pressure and reduce the flux of permeate. Some contaminants may adhere to the materials in the filtration modules. This may obstruct the crossflow of water on the feed side of the filtration membranes which reduces the clearing effect of the crossflow and can lead to fouling. This hydraulic resistance will also reduce the applied pressure for each subsequent filtration module in series which reduces the production of permeate in those modules. Some dissolved contaminants may reach saturation concentration and precipitate out of solution. This can occur on the surface of the filtration membrane causing fouling and increasing the hydraulic resistance across the filtration membrane and thereby reducing the trans-membrane flux (production of permeate).

Further it has also been shown (Ho et al. 2016, and Coster et al. 2021) that if a threshold trans-membrane flux ("critical flux") is exceeded (i.e. the flux of fluid through the membrane from the feed side to the permeate side) then the cross flow is insufficient to remove the at least one contaminant at a sufficient rate to prevent buildup of the at least one contaminant on the filtration membrane surface. Where the at least one contaminant includes dissolved silica, for example, the silica may exceed saturation concentration and may therefore form an immobile cake on the filtration membrane surface. Initial fouling caused by exceeding critical flux may be mitigated by increasing the cross flow and/or decreasing the transmembrane flux (permeate flow through the membrane). If allowed to continue, fouling may become impossible to remove except by chemical cleaning methods and in some cases may require the specific fluid filtration module to be replaced because cleaning protocols may no longer be sufficient to clear the fouling. It is noted here that the critical flux increases as the cross flow is increased so that increasing the cross flow may allow the transmembrane flux to drop below the critical flux.

Accordingly, it is very important for operators of fluid filtration systems to avoid operating the fluid filtration system above critical flux, ideally for each and every filtration module in the system, not just the average for the set of filtration modules in the series.

In embodiments where the fluid filtration system comprises a plurality of sensor modules, the fluid filtration system of the present aspect allows one or more properties of the feed fluid and/or permeate fluid to be determined at multiple points along the series of fluid filtration modules to thereby allow an operator to detect the approach of critical flux being reached for specific fluid filtration modules and to thereby take corrective action to avoid exceeding critical flux.

One sensor module of the at least one sensor module may be installed in a permeate tube of a first fluid filtration module and in a permeate tube of a second fluid filtration module that is adjacent to the first fluid filtration module in the series of fluid filtration modules. Accordingly, during use the permeate of the first fluid filtration module may flow from the permeate tube of the first fluid filtration module into the permeate tube of the second fluid filtration module through the sensor module. In embodiments where the sensor module comprises a tubular body the permeate of the first fluid filtration module may flow from the permeate tube of the first fluid filtration module into the permeate tube of the second fluid filtration module via the channel of the tubular body.

There may be a space between the permeate tube of the first fluid filtration module and the permeate tube of the second fluid filtration module. A portion of the sensor module may be exposed in the space. Accordingly, during use a portion of the sensor module may be exposed to the reject fluid flowing from the first fluid filtration module to the second fluid filtration module.

The permeate tube of the each fluid filtration module in the plurality of fluid filtration modules may form a continuous fluid pathway through the plurality of fluid filtration modules to the permeate outlet.

In some embodiments, the fluid filtration system may be a water filtration system. Accordingly, the plurality of fluid filtration modules may be a plurality of water filtration modules. Each water filtration module may comprise a water filtration membrane wrapped around a permeate tube. The permeate tube may extend from a first end of the water filtration module to a second end of the water filtration module. The permeate tube may be provided in the middle of the water filtration module. The permeate tube of each water filtration module may feed into the permeate tube the next water filtration module in the series. Therefore, permeate may flow along the permeate tube of the plurality of water filtration modules to a permeate outlet.

The fluid processed by the fluid filtration system may an aqueous liquid. The aqueous liquid may be salt water or sea water. The aqueous liquid may be waste water. The aqueous liquid may be sewage, industrial water, contaminated water, surface or ground water.

In embodiments where the fluid filtration system processes salt water, for example, the permeate may be water with reduced salinity and the reject may be water with increased salinity. The permeate may be water with substantially no salinity.

The fluid filtration system may comprise the same number of sensor modules as data collection modules. Accordingly, one data collection module may be associated with one sensor module. The fluid filtration system may comprise fewer data collection modules than sensor modules. Accordingly, at least one data collection module may be associated with and may receive data from more than one sensor module.

A data collection module of the at least one data collection module may be positioned adjacent to a sensor module of the at least one sensor module. The distance between a data collection module of the at least one data collection module and a sensor module of the at least one sensor module may be minimized by suitable positioning of the data collection module relative to the sensor module.

The fluid filtration system may comprise at least one energy transmitter. The energy transmitter may transmit energy to one or more of the at least one sensor module. Accordingly, the one or more sensor module of the at least one sensor module may receive energy from the at least one energy transmitter and may transmit data to a separate data collection module.

The fluid filtration system may comprise a central processing unit. The central processing unit may be configured to receive data from the at least one data collection module. The central processing unit may present data received from the at least one data collection module to a user.

According to a fifth aspect there is provided a method of monitoring a fluid filtration system of the fourth aspect, the method comprising the steps:
  providing a fluid filtration system comprising a fluid processing pressure vessel retaining a plurality of fluid filtration modules provided in series between an inlet, and a reject outlet and a permeate outlet;
  providing a plurality of sensor modules, at least one sensor module being positioned between adjacent fluid filtration modules, the adjacent fluid filtration modules comprising an upstream fluid filtration module and a downstream fluid filtration module, each sensor module of the plurality of sensor modules comprises a body, at least one sensor and a data transmitter;

providing at least one data collection module, the data collection module or each of the at least one data collection module being positioned outside the fluid processing pressure vessel and comprising a data receiver configured to receive data from the data transmitter of a sensor module of the plurality of sensor modules;

urging a fluid through the fluid processing pressure vessel such that the fluid flows from the inlet to the reject outlet and the permeate outlet through the plurality of fluid filtration modules;

each sensor module of the plurality of sensor modules determining at least one parameter of the fluid at the location of the sensor module;

each sensor module transmitting data related to the determined at least one parameter to a data collection module of the at least one data collection module; and wherein the at least one parameter determined by a sensor module in the plurality of sensor modules is indicative of the operating conditions of the associated fluid filtration module.

A change of the at least one parameter determined by a sensor module in the plurality of sensor modules compared to reference data may be indicative of fouling of the associated fluid filtration module.

Each sensor module of the plurality of sensor modules may be a sensor module of the first aspect.

Each data collection module of the at least one data collection module may be a data collection module of the second aspect.

The combination of a sensor module and a data collection module may be a detection system according to the third aspect.

The fluid filtration system may be a fluid filtration system according to the fourth aspect.

The determined at least one parameter may be selected from the group of parameters consisting of: flow rate, pressure, salinity/conductivity, viscosity, turbidity and temperature.

Each fluid filtration module may comprise a filtration membrane and a permeate tube such that during use at least some fluid passes through or into the filtration membrane into the permeate tube. At least one sensor module of the plurality of sensor modules may determine at least one parameter of the fluid flowing through the permeate tube. At least one sensor module of the plurality of sensor modules may determine at least one parameter of the fluid flowing past the filtration membrane. At least one sensor module of the plurality of sensor modules may determine at least one parameter of the fluid flowing through the permeate tube and at least one parameter of the fluid flowing past the filtration membrane.

The at least one parameter of the flowing through the permeate tube may include pressure. The at least one parameter of the flowing through the permeate tube may include conductivity.

The at least one parameter of the fluid flowing past the filtration membrane may include pressure. The at least one parameter of the fluid flowing past the filtration membrane may include conductivity.

The determination of pressure on the upstream and downstream sides of a fluid filtration module may allow the change in pressure across the fluid filtration module to be determined. The change in pressure across the fluid filtration module ($\Delta P$) may allow fouling of the feed side fabric of a fluid filtration membrane to be detected. The feed side fabric of a fluid filtration membrane may provide spacing between adjacent portions of fluid filtration membrane in a fluid filtration module. Fouling of the feed side fabric of a fluid filtration membrane may be bio-fouling. Fouling of the feed side fabric may occur predominantly in the first fluid filtration modules (e.g. the first, second and third fluid filtration modules) in a series of fluid filtration modules.

The determination of flow rate on the upstream and downstream sides of a fluid filtration module may allow the transmembrane flux, TMF, (i.e. the flux of fluid through the filtration membrane from the feed side to the permeate side) for a fluid filtration module to be determined. A detection of a reduction in TMF may allow scaling of the surface of a filtration membrane to be detected. Scaling of the filtration membrane may occur predominantly in the final fluid filtration modules (i.e. the last three fluid filtration modules) in a series of fluid filtration modules. TMF may be determined for a given filtration membrane in a method as described in the method of the sixth, seventh or eighth aspects below, for example.

In embodiments where both pressure and TMF are determined, the method may allow $\Delta P$ and TMF to be independently determined for a given fluid filtration module, to thereby allow the fouling of the fabric of the filtration membrane and scaling of the surface of the filtration membrane to be detected independently.

Each sensor module of the plurality of sensor modules may comprise a tubular body inserted into the permeate tube of adjacent fluid filtration modules.

Each sensor module of the plurality of sensor modules may comprise an at least one elongate element extending away from the tubular body. The at least one elongate element may extend from the tubular body between the filtration membranes of adjacent fluid filtration modules.

A sensor module of the plurality of sensor modules may be provided either side of a selected fluid filtration module or selected fluid filtration modules of the plurality of fluid filtration modules. A sensor module of the plurality of sensor modules may be provided between the first two fluid filtration modules of the plurality of fluid filtration modules. A sensor module of the plurality of sensor modules may be provided between the last two fluid filtration modules of the plurality of fluid filtration modules. A sensor module may be provided between each fluid filtration module of the fluid filtration system. A sensor or a sensor module of the plurality of sensor modules may be provided at the inlet of the fluid processing pressure vessel. A sensor or a sensor module of the plurality of sensor modules may be provided at the permeate outlet of the fluid processing pressure vessel. A sensor or a sensor module of the plurality of sensor modules may be provided at each of the inlet and permeate outlet of the fluid processing pressure vessel. A sensor or a sensor module of the plurality of sensor modules may be provided at the reject outlet of the fluid processing pressure vessel. Accordingly, at least one parameter may be determined for the fluid flowing into the inlet of the fluid processing pressure vessel and/or the fluid flowing out of the permeate outlet of the fluid processing pressure vessel and/or the fluid flowing out of the reject outlet of the fluid processing pressure vessel. In at least some embodiments, a sensor module of the plurality of sensor modules is provided between each pair of adjacent fluid filtration modules within the plurality of fluid filtration modules and a sensor or a sensor module of the plurality of sensor modules is provided at the inlet and the permeate outlet and the reject outlet of the fluid processing pressure vessel such that the change of the at least one parameter across each fluid filtration module within the plurality of fluid filtration modules is determined and compared to reference data to determine whether fouling has occurred for any fluid filtration module within the plurality of fluid filtration modules.

The method may include the step of adjusting the initial pressure of fluid flowing into the inlet of the fluid processing pressure vessel (i.e. the pressure of the fluid flowing into the inlet before it flows through the first fluid filtration module) when fouling is determined to have occurred. The method may include the step of adjusting the initial pressure of fluid flowing into the inlet of the fluid processing pressure vessel from a working pressure to a flushing pressure. The flushing pressure may be greater than the working pressure. Accordingly, the increase in pressure of the fluid flowing into the inlet may increase the cross flow across the filter membrane of the fluid filtration modules to thereby clear some or all of the build up of contaminants or fouling agents that may have caused the change of the at least one parameter.

The step of adjusting the initial pressure of fluid flowing into the inlet of the fluid processing pressure vessel may be carried out by an operator. The step of adjusting the initial pressure of fluid flowing into the inlet of the fluid processing pressure vessel may be carried out automatically. A pump pumping fluid into the inlet may be automatically controlled by a central processing unit such that the central processing unit is configured to adjust the pressure of fluid pumped by the pump. When fouling is determined, the central processing unit may adjust the pumping pressure from a working pressure to a flushing pressure. The pumping pressure may be returned to a working pressure after a predetermined period of time. The pumping pressure may be returned to a working pressure once fouling is determined to have been cleared. For example, the at least one parameter may return to be within normal bounds when compared to reference data.

The method may include the step of adjusting the reject flow rate of fluid flowing out of the fluid processing vessel to lower the fluid pressure and increase the reject flow rate to thereby increase the crossflow rate in the fluid filtration modules to flush the membrane surfaces of the fluid filtration modules.

The step of adjusting the pressure of fluid flowing out of the reject outlet of the fluid processing pressure vessel may be carried out by an operator. The step of adjusting the pressure of fluid flowing out of the reject outlet of the fluid processing pressure vessel may be carried out automatically. A reject outlet valve may be controlled to adjust the pressure at the reject outlet. When fouling is determined, the central processing unit may adjust the pressure at the reject outlet from a working pressure to a flushing pressure. The pressure at the reject outlet may be returned to a working pressure after a predetermined period of time. The pressure at the reject outlet may be returned to a working pressure once fouling is determined to have been cleared. For example, the at least one parameter may return to be within normal bounds when compared to reference data.

The method may be carried out for multiple fluid filtration modules of the fluid filtration system to thereby determine at least one parameter for multiple fluid filtration modules of the fluid filtration system. The method may be carried out to determine at least one parameter for each fluid filtration module of the plurality of fluid filtration modules of the fluid filtration system.

Data from each sensor module may be presented to the operator such that they can see each parameter of the at least one parameter determined by each sensor module per monitored fluid filtration module. Data from the sensor module either side of a given fluid filtration module may be used to present the at least one parameter across that fluid filtration module to the operator. For example, the change in pressure (or change in the pressure drop) across the fluid filtration module and/or the change in conductivity across the fluid filtration module may be presented to the operator. The at least one parameter may be presented to the operator numerically. The at least one parameter may be presented to the operator graphically. Colour may be used in the presentation of the at least one parameter to the operator. Colour may be used to differentiate values of one or more parameters that are within normal bounds from those that are outside normal bounds from those that are dangerously outside normal bounds, for example.

In some embodiments, the reference data may define the normal boundary values for the at least one parameter. Therefore, where the at least one parameter is determined to be within the reference data (i.e. it is within the normal boundary values for the at least one parameter) it may be indicative of normal working conditions with no fouling or substantially no fouling of the specific fluid filtration module. The reference data may define an upper limit for the at least one parameter, above which the change of the at least one parameter compared to the reference data may be indicative of fouling. The reference data may define a lower limit for the at least one parameter, below which the change of the at least one parameter compared to the reference data may be indicative of fouling. The reference data may define a target value or range of values for the at least one parameter.

The reference data may be specific to an individual fluid filtration system. The reference data may be specific to an individual fluid filtration module. The reference data may be specific to a specific type, size or configuration of fluid filtration module.

The reference data may have been acquired or derived by the operator from the fluid filtration system provided in the method of the present aspect. For example, the operator may acquire the at least one parameter from each sensor module of the plurality of sensor modules when each fluid filtration module is known to be clean to thereby acquire or derive reference data.

The reference data may be provided to the operator by a third party.

According to a sixth aspect there is provided a method of determining the trans-membrane flux of fluid through a filtration membrane, the method comprising the steps:
 providing a filtration membrane;
 flowing fluid past the filtration membrane;
 determining the initial flow rate of fluid before it flows past the filtration membrane;
 determining the initial concentration of a species in the fluid before it flows past the filtration membrane;
 determining the final concentration of the species in the fluid after it has flowed past the filtration membrane;
 calculating the change in concentration of the species from the initial concentration and the final concentration;
 calculating the final flow rate of fluid flowing after it has flowed past the filtration module from the calculated change in concentration of the species and the initial flow rate of fluid; and calculating the flux of fluid that has passed through the filtration membrane from the difference between the initial flow rate of fluid and the final flow rate of fluid.

The species may be ions within the fluid. The fluid may be an aqueous fluid comprising salt ions, such as sea water, for example. The concentration of ions within the fluid may be determined by measuring or determining the conductivity of the fluid.

The species may be particulates within the fluid. The fluid may be an aqueous fluid comprising particulates. The fluid may be a non-aqueous fluid. The concentration of particulates in the fluid may be determined by measuring the turbidity of the fluid.

The method may include the step of determining the concentration of the species in the permeate fluid at two ends of the permeate tube at either end of the fluid filtration module.

The step of calculating the flux of fluid that has passed through the filtration membrane (i.e. the transmembrane flux) may take into account the surface area of the filtration membrane.

The initial flow rate of fluid for the first fluid filtration module of a series of fluid filtration modules may be determined at the inlet of a fluid processing pressure vessel. The initial flow rate of fluid for the second fluid filtration module of a series of fluid filtration modules may be the final flow rate of fluid for the first fluid filtration module. The initial flow rate of fluid for the third fluid filtration module of a series of fluid filtration modules may be the final flow rate of fluid for the second fluid filtration module. Accordingly, the transmembrane flux may be determined for a given fluid filtration module in a series of fluid filtration modules without requiring the direct measurement of the initial flow rate of fluid for that fluid filtration module.

It will be appreciated that the steps of determining the initial flow rate of fluid before it flows past the filtration membrane, determining the initial concentration of a species in the fluid before it flows past the filtration membrane, and determining the final concentration of the species in the fluid after it has flowed past the filtration membrane may be carried out in any order or at the same time.

In a seventh aspect there is provided a method of determining the flux of fluid through a filtration membrane, the method comprising the steps:
providing a filtration membrane;
flowing fluid past the filtration membrane;
determining the initial flow rate of fluid before it flows past the filtration membrane;
determining the initial conductivity of the fluid before it flows past the filtration membrane;
determining the final conductivity of the fluid after it has flowed past the filtration membrane;
calculating the change in conductivity from the initial concentration and the final concentration;
calculating the final flow rate of fluid flowing after it has flowed past the filtration membrane from the calculated change in conductivity and the initial flow rate of fluid; and
calculating the flux of fluid that has passed through the filtration membrane from the difference between the initial flow rate of fluid and the final flow rate of fluid.

The fluid may be an aqueous fluid. The fluid may be an ionic fluid. The fluid may be a polar fluid.

The filtration membrane may be a water filtration membrane. The fluid may be salt water. The fluid may be sea water. As the fluid interacts with the water filtration membrane water may pass through or into the water filtration membrane but the ions dissolved in the water to make up the fluid are restricted from passing through or into the water filtration membrane. Accordingly, as the volume of fluid that has flowed past the water filtration membrane is reduced due to the transfer of water through the water filtration membrane the concentration of ions dissolved in the fluid on the feed/reject side increases. As the concentration of ions increases, the conductivity of the fluid increases proportionally.

In embodiments where the fluid filtration modules include reverse osmosis membranes or filtration membranes that substantially restrict the passage of ions, simply measuring the conductivity of the fluid before and after a water filtration membrane in a water filtration module allows the flux of water through or into the water filtration membrane to be calculated from the measured change in conductivity and the flow rate of fluid entering the fluid filtration module.

The step of calculating the flux of fluid that has passed through the filtration membrane (i.e. the transmembrane flux) may take into account the surface area of the filtration membrane.

The method may include the step of determining the initial conductivity of the fluid flowing into the permeate tube of the fluid filtration module. The method may include the step of determining the final conductivity of the fluid flowing out of the permeate tube of the fluid filtration module. Accordingly, the method may include the step of calculating the change in conductivity of the permeate fluid by comparing the initial conductivity and the final conductivity. The step of calculating final flow rate of fluid flowing after it has flowed past the filtration membrane may additionally use the calculated change in conductivity of the permeate fluid to thereby determine the flux of fluid through the filtration membrane. In embodiments where substantially no dissolved ions pass through the filtration membrane there will be substantially no change in conductivity of the permeate fluid. In embodiments where a significant concentration of ions passes through the filtration membrane there may be a significant change in conductivity of the permeate fluid and determining this change in concentration may provide a more accurate measurement of the flux of fluid through the filtration membrane.

According to an eighth aspect there is provided a method of determining the flux of fluid across a filtration membrane, the method comprising the steps:
providing a filtration membrane;
flowing fluid past the filtration membrane;
determining the initial turbidity of the fluid before it flows past the filtration membrane;
determining the final turbidity of the fluid after it flows past the filtration membrane;
determining the initial flow rate of fluid before it flows past the filtration membrane;
calculating the change in turbidity by comparing the initial turbidity and the final turbidity;
calculating the final flow rate of fluid flowing after it has flowed past the filtration membrane from the calculated change in turbidity and the initial flow rate of fluid; and
calculating the flux of fluid that has passed through the filtration membrane from the difference between the initial flow rate and the final flow rate.

The fluid may be a non-aqueous fluid. The fluid may be an aqueous fluid. The fluid may comprise particulates.

As fluid passes the filtration membrane, fluid may pass through or into the filtration membrane to a permeate tube.

A fluid comprising a population of particulates may have a higher turbidity than a similar fluid that does not comprise a population of particulates. As the fluid passes the filtration membrane fluid passes through or into the filtration membrane and the population of particulates may be restricted from passing through the filtration membrane or may not pass through the filtration membrane. Accordingly, the concentration of particulates in the remaining fluid increases as the volume of fluid decreases.

Therefore, simply measuring the turbidity of the fluid before and after a filtration membrane in a fluid filtration module in combination with the initial flow rate of fluid allows the flux of fluid through the filtration membrane to be calculated from the measured difference in turbidity alone.

The step of calculating the flux of fluid that has passed through the filtration membrane (i.e. the transmembrane flux) may take into account the surface area of the filtration membrane.

The method may include the step of determining the initial turbidity of the fluid flowing into the permeate tube of the fluid filtration module. The method may include the step of determining the final turbidity of the fluid flowing out of the permeate tube of the fluid filtration module. The method may include the step of calculating the change in turbidity of the permeate fluid by comparing the initial turbidity and the final turbidity. The step of calculating the final flow rate of fluid may additionally use the calculated change in turbidity of the permeate fluid to thereby determine the flux of fluid through the filtration membrane. In embodiments where substantially no particulates pass through the filtration membrane there will be substantially no change in turbidity of the permeate fluid. In embodiments where a significant concentration of particulates passes through the filtration membrane there may be a significant change in turbidity of the permeate fluid and determining this change in concentration may provide a more accurate measurement of the flux of fluid through the filtration membrane.

For the avoidance of doubt, features of the sensor module of the first aspect are features of the sensor module of the subsequent aspects. Features of the data collection module of the second aspect are features of the data collection module of the subsequent aspects. Features of the detection system of the third aspect are features of the combination of a sensor module and a data collection module of the subsequent aspects. Features of the fluid filtration system of the fourth aspect are features of the fluid filtration systems of the subsequent aspects.

BRIEF DESCRIPTION OF THE FIGURES

Embodiments of the present invention will now be described, by way of non-limiting example, with reference to the accompanying drawings.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The apparatus, systems and methods of the present disclosure are suitable for filtration of any appropriate fluid. The apparatus and systems of the present disclosure are exemplified below using a water filtration system such as those used in desalination plants that produce potable water from sea water. This example should not be construed as limiting on the applications of the apparatus, systems and methods of the disclosure and are merely illustrative of the underlying principles.

Example 1

Figure 1A:
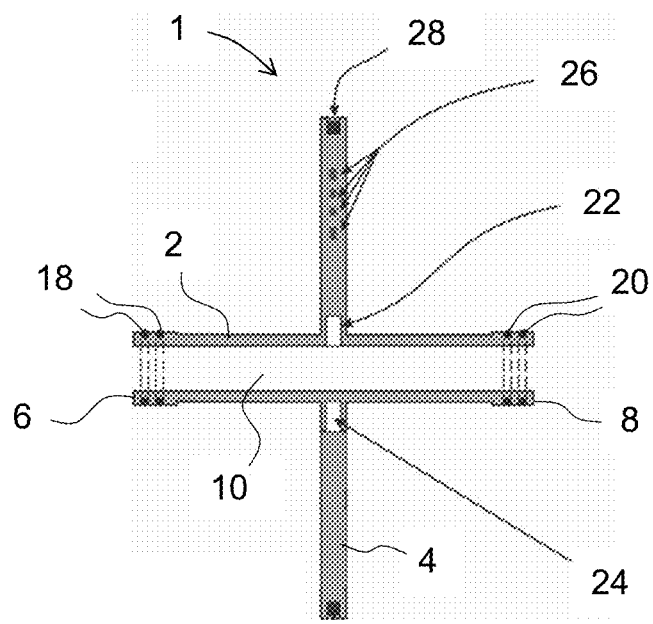
FIG. 1: A) a side cross section view of a sensor module according to an embodiment, and B) a front view of a sensor module according to an embodiment.
Figure 1B:
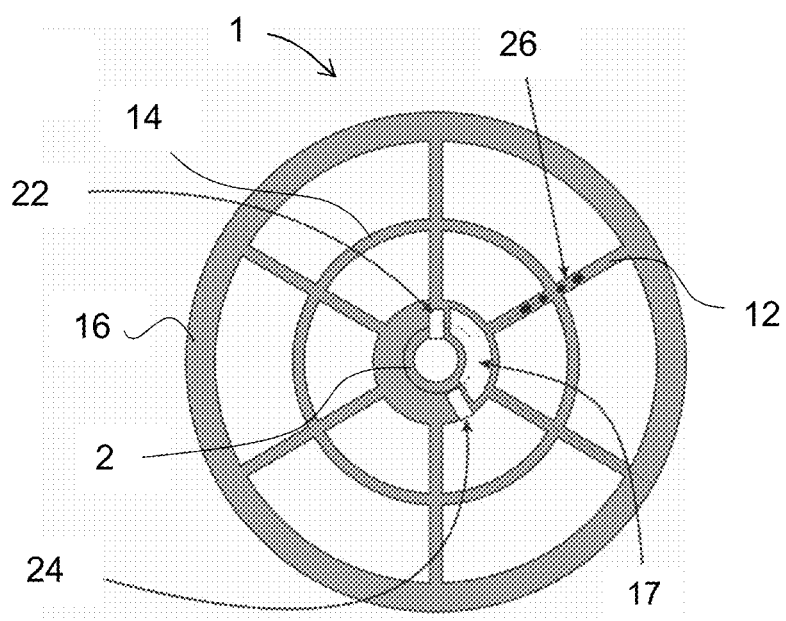

With reference to FIGS. 1A and 1B there is provided a sensor module 1 comprising a tubular body 2 and a support 4 extending from the tubular body 2. The tubular body 2 comprises a first end 6 and a second end 8 and a channel 10 extending from the first end 6 to the second end 8. The support 4 comprises radial elements (acting as elongate elements, for example 12), an inner circular connecting portion 14 and an outer circular connecting portion 16. Control electronics 17 are provided adjacent the tubular body 2. The first end 6 comprises two sealing o-rings 18 and the second end 8 comprises two sealing o-rings 20. The tubular body 2 further comprises a first pressure transducer 22 (acting as a first pressure sensor) on the inside of the channel 10 and a second pressure transducer 24 (acting as a second pressure sensor) on the outside of the tubular body 2.

One radial element 12 comprises an array of conductivity sensors 26. The support 4 comprises a target device 28 at the extremity of the support 4 furthest from the tubular body 2. The target device 28 comprises a near-field induction coil configured to receive energy from an external initiator device and to modulate the carrier electromagnetic field of an external initiator device.

Figure 2:
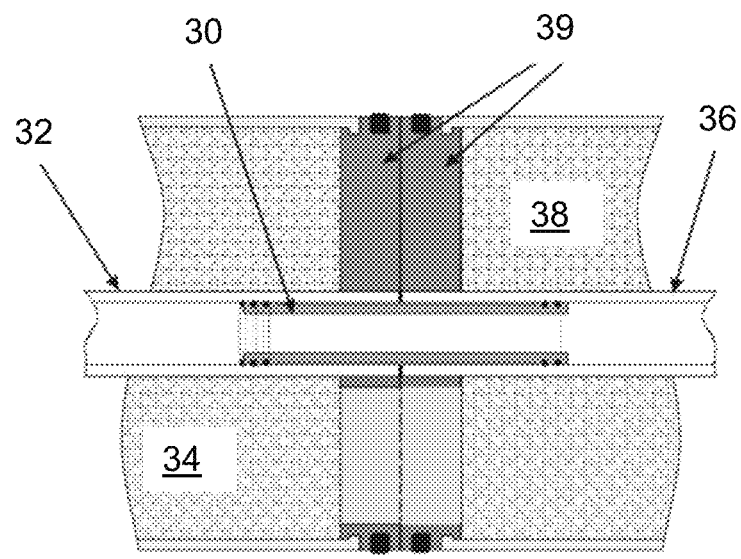
FIG. 2: A side cross sectional view of two adjacent water filtration modules connected by a connector tube.
Figure 3:
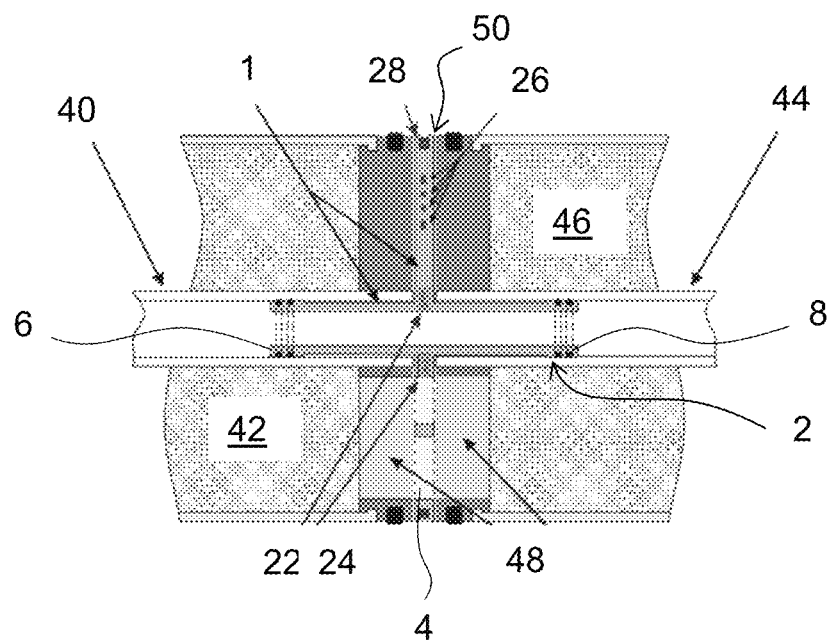
FIG. 3: A side cross sectional view of two adjacent water filtration modules connected by a sensor module according to an embodiment.

Typically, adjacent water filtration modules in water filtration plants are connected together with a connector pipe 30 that connects the permeate pipe 32 (acting as a permeate tube) of a first water filtration module 34 to the permeate pipe 36 (acting as a permeate tube) of the adjacent second water filtration module 38 (see FIG. 2, for example). An example connector pipe 30 is a cylindrical tube having an outer diameter of 25 mm with first and second ends comprising two o-rings to seal the connection between the connector pipe and a permeate pipe, the first and second ends having an outer diameter of 27 mm. With reference to FIG. 3, the connector pipe 30 is replaced with a sensor module 1. The sensor module 1 is installed between adjacent water filtration modules. The first end 6 of the tubular body 2 is inserted into the permeate tube 40 of a first water filtration module 42 and the second end 8 of the tubular body 2 is inserted into the permeate tube 44 of a second water filtration module 46. The o-rings 18 of the first end 6 form a seal between the inner surface of the permeate tube 40 of the first water filtration module 42 and the tubular body 2 and the o-rings 20 of the second end 8 forms a seal between the inner surface of the permeate tube 44 of the second water filtration module 46 and the tubular body 2. The support 4 extends from the tubular body 2 across the anti-telescoping device 48 (acting as a cap) of the first and second water filtration modules 42, 46 such that the target device 28 is positioned adjacent to the outside 50 of the first and second water filtration devices 42, 46.

Example 2

An example system within which the sensor module of example 1 can be used is a sea water filtration/desalination plant where sea water is processed in a desalination process to produce substantially pure water.

Figure 4:
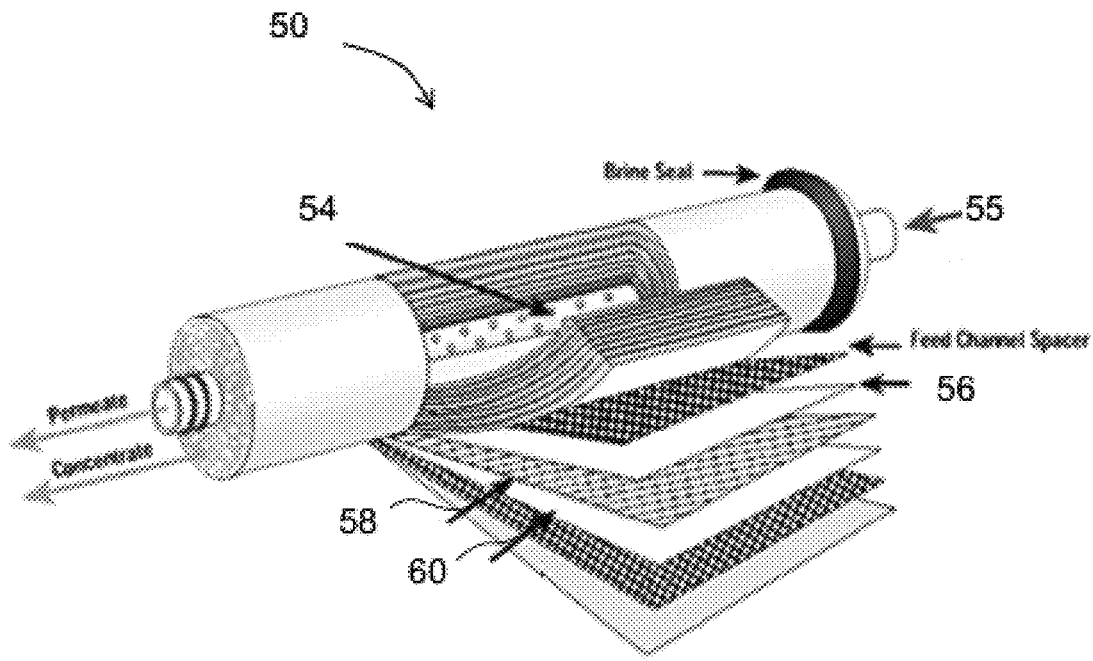
FIG. 4: An example water filtration module used in the art.
Figure 5:
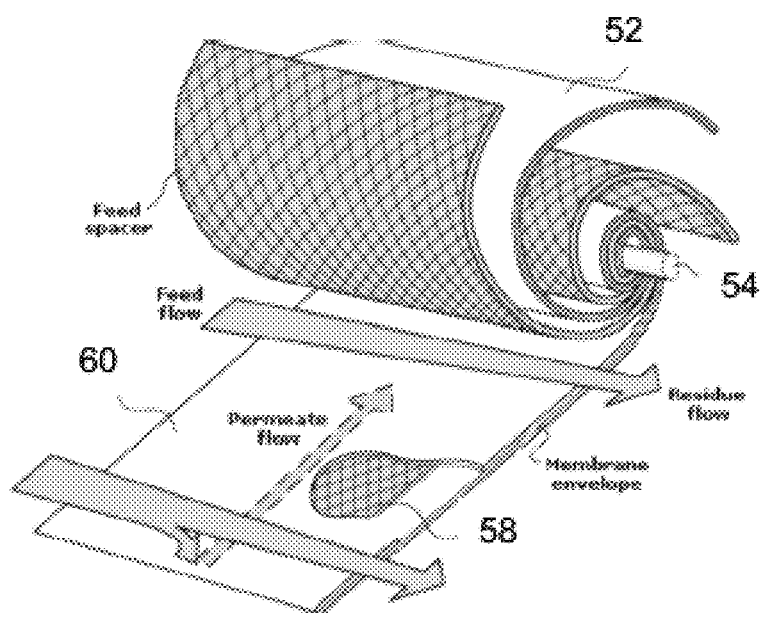
FIG. 5: An example water filtration membrane wrapped around a permeate tube from a water filtration module.
Figure 6:
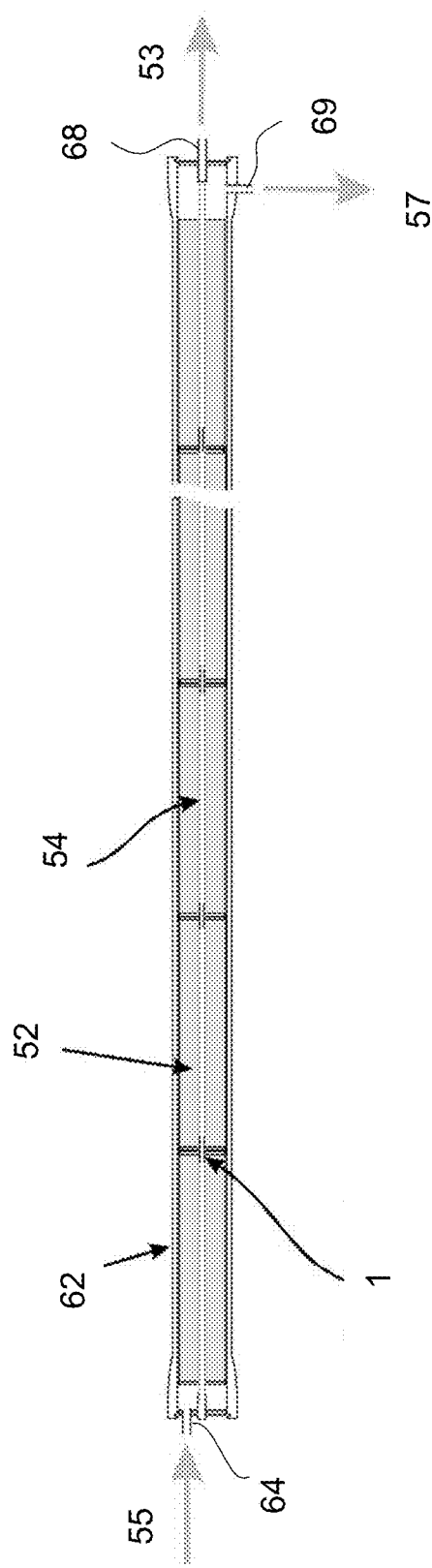
FIG. 6: A side cross sectional view of a water filtration system of the art.

Desalination processes typically pump sea water or another source of salty water (the feed) to be processed through a plurality of water filtration modules provided in series within a pressure vessel (acting as a fluid processing pressure vessel). With reference to FIGS. 4-6 example industry standard water filtration modules 50 comprise a filtration membrane 52 wrapped around a perforated permeate collection pipe 54 (acting as a permeate tube). The filtration membranes 52 are retained within the water filtration module 50 by anti-telescoping devices (acting as caps) that prevent the filtration membrane 52 from being pushed out of the water filtration module 50 when water is urged through the water filtration module 50 at high flow rates during use. The filtration membrane 52 comprises a filtration membrane envelope that comprises a first membrane 56, a permeate spacer 58 and a second membrane 60 such that during use water flows across the first membrane 52 and the second membrane 60 into the permeate spacer 58. From the permeate spacer 58 the water flows into the perforated permeate collection pipe 54. The filtration membrane 52 thereby filters salt and other impurities from the water such that substantially pure water 53 is collected in the perforated permeate collection pipe 54.

The feed 55 that enters a water filtration module 50 has a given salinity and the feed that exits the other side of the water filtration module 50 (the reject) typically has a higher salinity due to the reduction in the volume of water in the feed as water (permeate) is filtered out of the feed into the permeate collection pipe 54.

Accordingly, the feed 55 entering a second water filtration module will have a higher salinity and a lower pressure, and a lower flow rate due to the reduction in volume and hydraulic resistance in the first module, than that of the feed entering the preceding first water filtration module.

In some facilities the pressure vessel may retain seven water filtration modules provided in series. Accordingly, the feed flows through the water filtration system from a first water filtration module to the seventh water filtration module via the second through sixth water filtration modules in sequence.

Alternative pressure vessels may retain two, three, five, ten or fourteen or any other number of water filtration modules, for example.

A pressure vessel 62 has an inlet 64 that feeds into a first water filtration module 66. The pressure vessel 62 further includes a permeate outlet 68 to thereby allow the permeate to be removed from the pressure vessel 62. The pressure vessel 62 includes a reject outlet 69 to thereby allow the feed that has passed through all water filtration modules 70 (also known as reject 57) to flow out of the pressure vessel 62. The resulting reject may then flow into another pressure vessel for further processing. The pressure vessel 62 of this example retains seven water filtration modules provided in series.

Figure 7:
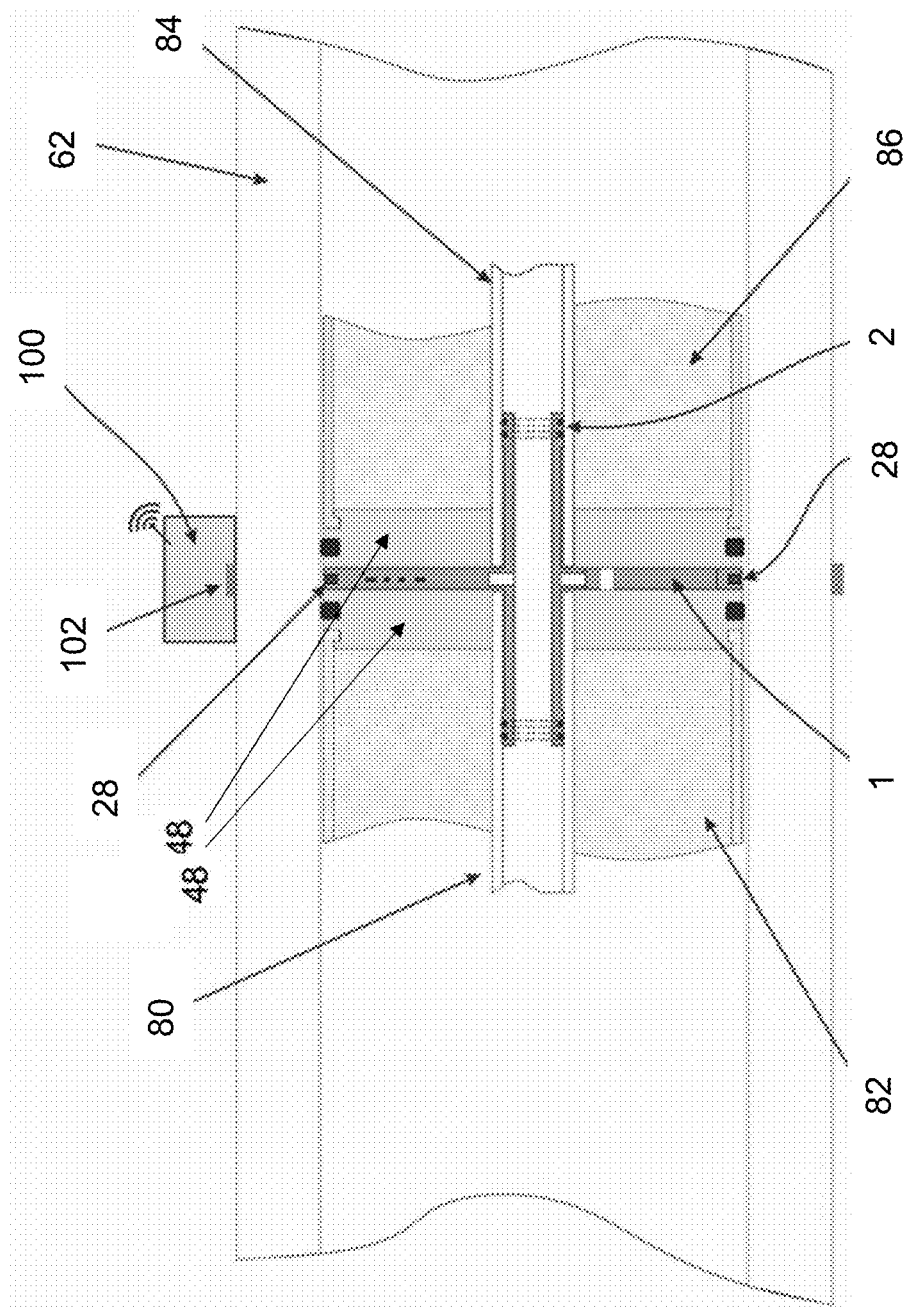
FIG. 7: A side cross sectional view of a detection system according to an embodiment installed in a pressure vessel of a water filtration system.

Typically, with reference to FIG. 7, the permeate collection pipe 80 of a first water filtration module 82 feeds into the permeate collection pipe 84 of a second water filtration module 86 and so on such that the permeate collection pipes of the series of water filtration modules form a continuous permeate collection pipe.

Previously, operators of a desalination plant that comprises many banks of pressure vessels, for example, would use data obtained from feed at the inlet of the pressure vessel and at the reject outlet of the pressure vessel to determine the performance of the each bank of pressure vessels. Typically, a measured change in the pressure drop across the pressure vessel as a whole or a change in the transmembrane pressure or of the overall salt passage was indicative of either a failure or fouling of membranes within the series of water filtration modules, which would result in the specific bank of pressure vessels concerned being taken off line and a course of treatment be applied to the specific pressure vessel.

In this example, a sensor module 1 according to example 1 is provided between adjacent water filtration modules such that a sensor module 1 is provided after each water filtration module such that pressure data and conductivity data can be provided for each water filtration module. For example, as shown in FIG. 7, a sensor module 1 is provided in the permeate collection pipe 80 of a first water filtration module 82 and the permeate collection pipe 84 of a second water filtration module 86. Sensors (not shown) are also provided at the inlet 64 of the pressure vessel 62 to determine the pressure and conductivity of the fluid entering the pressure vessel 62 during use and sensors (not shown) are provided at the reject outlet.

Referring to FIG. 7, a data collection module 100 is provided on the outside of the pressure vessel 62 for each sensor module 1. The data collection module 100 comprises an initiator device 102 configured to communicate with and to power the corresponding sensor module 1 via the target device 28 of that sensor module 1. Each data collection module 100 is positioned on the pressure vessel 62 such that the initiator device 102 of that data collection module 100 is positioned adjacent to the target device 28 of the sensor module 1.

During use, sea water is urged under high pressure (up to approximately 100 bar) into the inlet 64 of the pressure vessel 62 such that the sea water flows through each water filtration module sequentially. Water is removed from the sea water via the permeate outlet 68 that has collected water from each water filtration module.

Each sensor module 1 collects pressure data and conductivity data and transmits that data to the corresponding data collection module 100. Each data collection module 100 transmits the received data to a central processing unit (not shown) where the data is collated and analyzed. In addition, the data from the inlet 64 and the reject outlet 80 is also transmitted to the central processing unit for collation and analysis.

The central processing unit calculates the change in pressure (ΔP), the transmembrane pressure (TMP), salt passage (from measured conductivity) and the change in conductivity (ΔC) across each water filtration module. A change in any or all of the parameters for a given water filtration module from normal operation values (acting as reference data) for that water filtration module is indicative of either failure or fouling of that specific water filtration module.

Typically, a change in ΔP compared to reference data for one of the first two water filtration modules in the series of water filtration modules is indicative of biofouling and therefore, an operator knows that the likely corrective action to take is to apply or regulate the dosage of a biocide or similar anti-biofouling composition to the modules in that pressure vessel.

Typically, a change in TMP and/or transmembrane flux (TMF) compared to reference data for one of the final two water filtration modules in the series of water filtration modules is indicative of mineral scaling and therefore, an operator knows that the likely corrective action to take when the TMP or TMF for one of the final water filtration modules changes from normal operation TMP or TMF is to apply or regulate the dosage of an anti-scalant composition to the feed solution for that pressure vessel.

The data is provided regularly to the operator such that fouling incidents can be addressed early by an operator to thereby reduce downtime for the water filtration system and to minimize the risk of damage to the water filtration modules.

Provision of the ΔC for the feed/reject water for each water filtration module also allows the flux of water through the filtration membranes of the water filtration modules, known as trans-membrane flux, to be calculated.

As has been previously described above, the removal of water from sea water by a water filtration module reduces the volume of fluid but retains the same amount of salt. Accordingly, the concentration of salt increases directly in proportion to the change in volume of water within the sea water fed into a subsequent water filtration module (the feed water). The measured conductivity of feed water is proportional to the salt concentration of the feed water.

The measurement of ΔC per water filtration module along with the known total feed flow rate into the pressure vessel allows an operator to determine the change in concentration of salt in the sea water across the water filtration module and therefore to determine the change in volume of the sea water to thereby determine the flux of water through the filtration membrane per water filtration module (the trans-membrane flux).

Determination of the trans-membrane flux per water filtration module allows an operator to identify any change in the trans-membrane flux of any individual water filtration module to thereby identify any reduction in the trans-membrane flux early and to thereby apply a corrective action if necessary.

Further, the ability to monitor the trans-membrane flux per water filtration module over time allows any change in trans-membrane flux for any given water filtration module that may be associated with the onset of critical flux to be detected. Accordingly, the operator may determine that critical flux is approaching for one specific water filtration module and may take preventative action to prevent critical flux from occurring. For example, the operator may decrease the pressure inside the pressure vessel by opening a reject outlet valve to thereby reduce the driving pressure and increase the cross-flow to clear contamination and prevent critical flux being exceeded.

Example 3

Figure 8:
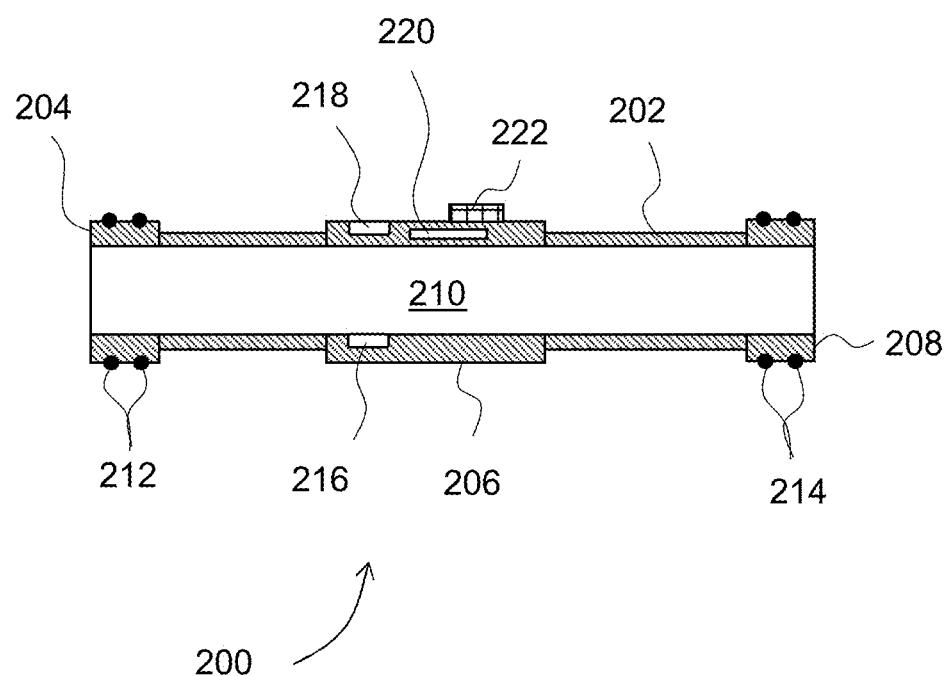
FIG. 8: A side cross sectional view of sensor module according to an embodiment.

With reference to FIG. 8, a sensor module 200 comprises a tubular body 202. The tubular body 202 comprises a first end 204, a central portion 206 and a second end 208 opposed to the first end 204. A channel 210 extends from the first end 204 to the second end 208. The first end 204 comprises two sealing o-rings 212 and the second end 208 comprises two sealing o-rings 214. The central portion 206 further comprises a first pressure sensor 216 on the inside of the channel 210 of the tubular body 202 and a second pressure sensor 218 on the outside of the tubular body 202. The central portion 206 further comprises a battery 220 and a data transmitter 222.

The first end 204 of the tubular body 202 is configured to be inserted into the permeate pipe (acting as a permeate tube) of a first fluid filtration module and the second end 208 of the tubular body 202 is configured to be inserted into the permeate pipe of a second fluid filtration module that is adjacent to the first fluid filtration module in a series of fluid filtration modules. The first pressure sensor 216 is exposed to fluid flowing through the channel 210 of the tubular body 202. The second pressure sensor 218 is exposed to fluid flowing between the adjacent fluid filtration modules past the exterior of the tubular body 202.

During use, the sensor module 200 is powered by the battery 220. Pressure data is determined by the first pressure sensor 216 and the second pressure sensor 218 and transmitted to an external device by the data transmitter 222.

Example 4

A water filtration system (not shown) comprises fourteen water filtration modules provided in series within two pressure vessels (seven water filtration modules retained in a first pressure vessel and seven water filtration modules retained within a second pressure vessel) connected in series. The arrangement of pressure vessels comprises an inlet, a permeate outlet and a reject outlet with the reject outlet of the first pressure vessel being connected to the inlet of the second pressure vessel and the permeate outlet of the first pressure vessel being connected to the permeate tube of the second pressure vessel. Each water filtration module corresponds to a water filtration module as described in Example 2. A sensor module according to Example 3 is provided between the first and second water filtration modules, the second and third water filtration modules, the fifth and sixth water filtration modules, and the sixth and seventh water filtration modules of the first pressure vessel and of the second pressure vessel. A sensor module is also provided at the inlet of the first pressure vessel and the second pressure vessel. A sensor module is also provided at the reject outlet of the first pressure vessel and the reject outlet of the second pressure vessel.

A data collection module is provided on the outside of the pressure vessel for each sensor module. The data collection module comprises an initiator device configured to communicate with the corresponding sensor module via the transmitter of that sensor module. Each data collection module is positioned on the pressure vessel such that the initiator device of that data collection module is positioned adjacent to the transmitter of the sensor module.

During use, data is collected as described for Example 2. The operator is presented with data for the first, second, sixth and seventh water filtration modules for each pressure vessel to allow them to monitor the performance of each water filtration module in each pressure vessel and to thereby detect a drop in performance of any of these water filtration modules independently. As a result the operator is able to address any drop in performance for any of the monitored water filtration modules early to thereby ensure that the water filtration system runs at maximum efficiency.

While there has been hereinbefore described approved embodiments of the present invention, it will be readily apparent that many and various changes and modifications in form, design, structure and arrangement of parts may be made for other embodiments without departing from the invention and it will be understood that all such changes and modifications are contemplated as embodiments as a part of the present invention as defined in the appended claims.

The invention claimed is:

1. A fluid filtration system comprising:
a fluid processing pressure vessel comprising:
a plurality of fluid filtration modules provided in series between an inlet, and a reject outlet and a permeate outlet, each fluid filtration module of the plurality of fluid filtration modules comprises a permeate pipe;
a plurality of sensor modules including an individual sensor module; and
at least one data collection module,
each of the plurality of sensor modules comprises a tubular body, at least one sensor, an energy receiver, and a data transmitter,
each of the at least one data collection module comprises an energy transmitter and a data receiver configured to receive data from the data transmitter of a corresponding sensor module of the plurality of sensor modules;
wherein the individual sensor module is positioned between two adjacent fluid filtration modules of the plurality of fluid filtration modules such that the tubular body of the individual sensor module is configured to be retro-fitted to be inserted or installed into the permeate pipe of each of the adjacent fluid filtration modules to thereby connect the permeate pipes of the adjacent fluid filtration modules,
wherein an individual data collection module of the at least one data collection module is positioned outside of the fluid processing pressure vessel within a predetermined distance from the individual sensor module,
wherein during use fluid flows into the inlet of the fluid processing pressure vessel, through each fluid filtration module of the plurality of fluid filtration modules sequentially and permeate flows out of the permeate outlet and reject flows out of the reject outlet,
wherein each data collection module of the at least one data collection module is operable to provide a carrier electromagnetic field such that (1) the energy receiver of each of the plurality of sensor modules receives energy from the energy transmitter of the corresponding data collection module and (2) each of the plurality of sensor modules communicates with the corresponding data collection module via near field communication.

2. The fluid filtration system of claim 1, wherein a sensor module of the plurality of sensor modules is provided either side of a selected fluid filtration module or selected fluid filtration modules of the plurality of fluid filtration modules.

3. The fluid filtration system of claim 1, wherein a sensor module is provided between each pair of adjacent fluid filtration modules.

4. The fluid filtration system of claim 1, wherein the at least one sensor is configured to determine at least one parameter of fluid flowing through the tubular body and/or past the exterior of the tubular body.

5. The fluid filtration system of claim 1, wherein the body of each sensor module of the plurality of sensor modules comprises at least one sensor.

6. The fluid filtration system of claim 1, wherein each sensor module of the plurality of sensor modules comprises at least one elongate element extending away from the body.

7. The fluid filtration system of claim 6, wherein the at least one elongate element comprises at least one sensor.

8. The fluid filtration system of claim 1, wherein the energy receiver is configured to receive power from the external energy transmitter to thereby power the corresponding sensor module.

9. The fluid filtration system of claim 1, wherein a sensor or a sensor module is provided upstream of a first fluid filtration module of the series of fluid filtration modules and a sensor or sensor module is provided downstream of a final fluid filtration module of the series of fluid filtration modules.

10. The fluid filtration system of claim 6, wherein the at least one elongate element comprises the energy receiver.

11. The fluid filtration system of claim 10, wherein the at least one elongate element has a distal end furthest from the tubular body and the energy receiver is positioned at the distal end.

12. The fluid filtration system of claim 1, wherein the at least one data collection module is positioned on the exterior of the fluid processing vessel.

13. The fluid filtration system of claim 12, wherein the at least one data collection module is adjacent to a sensor module of the plurality of sensor modules.

14. The fluid filtration system of claim 13, wherein the at least one data collection module comprises a plurality of data collection modules and a data collection module of the plurality of data collection modules is adjacent to each sensor module of the plurality of sensor modules.

* * * * *